United States Patent
Ogawa

(10) Patent No.: US 6,885,622 B2
(45) Date of Patent: Apr. 26, 2005

(54) TRACK OFFSET COMPENSATION IN OPTICAL DISK DRIVES USING BEAT-INDUCING SIGNALS

(75) Inventor: Masatsugu Ogawa, Tokyo (JP)

(73) Assignee: NEC Corporation (JP)

( * ) Notice: Subject to any disclaimer, the term of this patent is extended or adjusted under 35 U.S.C. 154(b) by 386 days.

(21) Appl. No.: 10/072,194

(22) Filed: Feb. 7, 2002

(65) Prior Publication Data

US 2002/0105864 A1 Aug. 8, 2002

(30) Foreign Application Priority Data

Feb. 7, 2001 (JP) .......................... 2001-030526

(51) Int. Cl.⁷ .............................................. G11B 7/085
(52) U.S. Cl. ............................... 369/53.28; 369/44.13; 369/53.34
(58) Field of Search .................... 369/44.29, 44.35, 369/53.28, 53.34, 44.13

(56) References Cited

U.S. PATENT DOCUMENTS

| | | | | |
|---|---|---|---|---|
| 4,459,690 A | * | 7/1984 | Corsover et al. | 369/44.13 |
| 4,571,712 A | * | 2/1986 | Romano et al. | 369/44.33 |
| 5,646,919 A | * | 7/1997 | Eastman et al. | 369/44.26 |
| 6,345,023 B1 | * | 2/2002 | Fushimi et al. | 369/47.36 |
| 6,594,210 B1 | * | 7/2003 | Kumagai | 369/47.17 |

FOREIGN PATENT DOCUMENTS

| | | |
|---|---|---|
| JP | 05-151600 | 6/1993 |
| JP | 09-007200 | 1/1997 |
| JP | 09-259455 | 10/1997 |
| JP | 2000-163765 | 6/2000 |

* cited by examiner

Primary Examiner—Hoa T. Nguyen
Assistant Examiner—Michael V. Battaglia
(74) Attorney, Agent, or Firm—Hayes Soloway P.C.

(57) ABSTRACT

A method for compensating track offset in an optical disk drive is provided, which achieves complete compensation of the track offset and than reduces the compensation time for the track offset. (a) An optical disk with wobbled grooves is provided, the wobbled grooves being used for generating a wobbling signal with a wobbling period. (b) A beat-inducing signal is recorded on the disk. The period of the beat-inducing signal has a specific relationship with the wobbling period in such a way that a beat signal is induced by the beat-inducing signal and the wobbling signal. (c) A tracking-error signal is generated using a push-pull method by optically reading the wobbled grooves of the disk and the beat-inducing signal recorded on the disk. The tracking-error signal contains a beat signal induced by the beat-inducing signal and the wobbling signal. (d) Track offset is compensated based on the beat signal contained in the tracking-error signal.

25 Claims, 11 Drawing Sheets

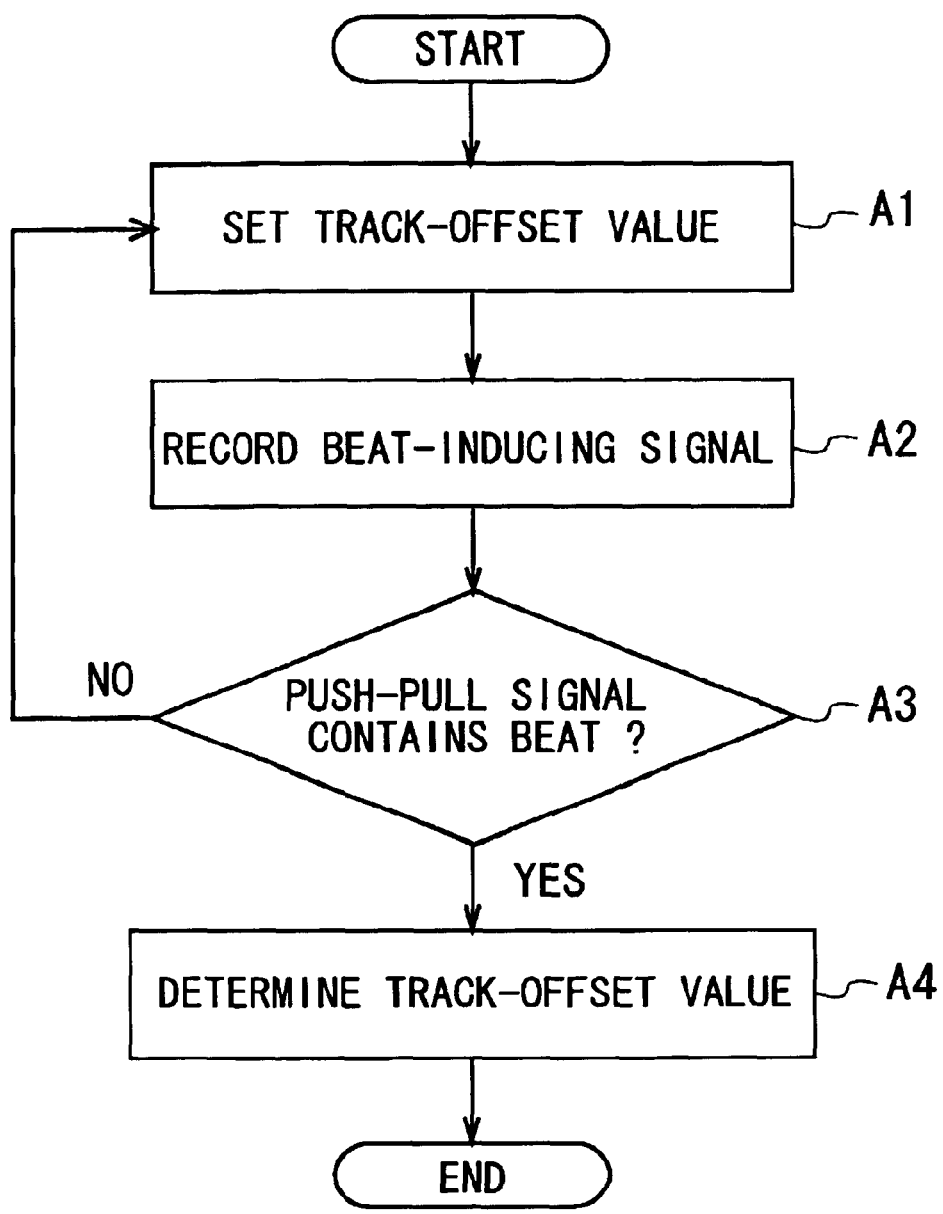

FIG. 14
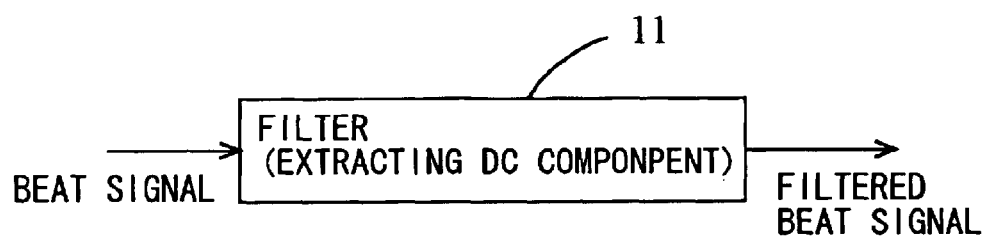
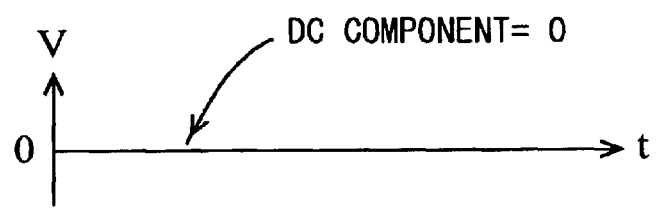
FIG. 15A
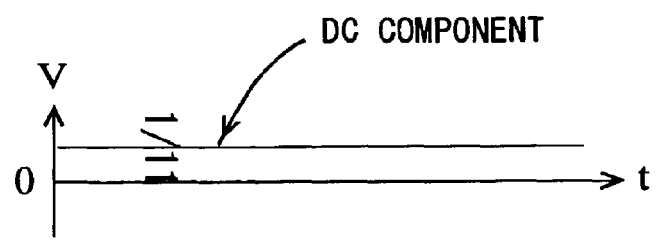
FIG. 15B

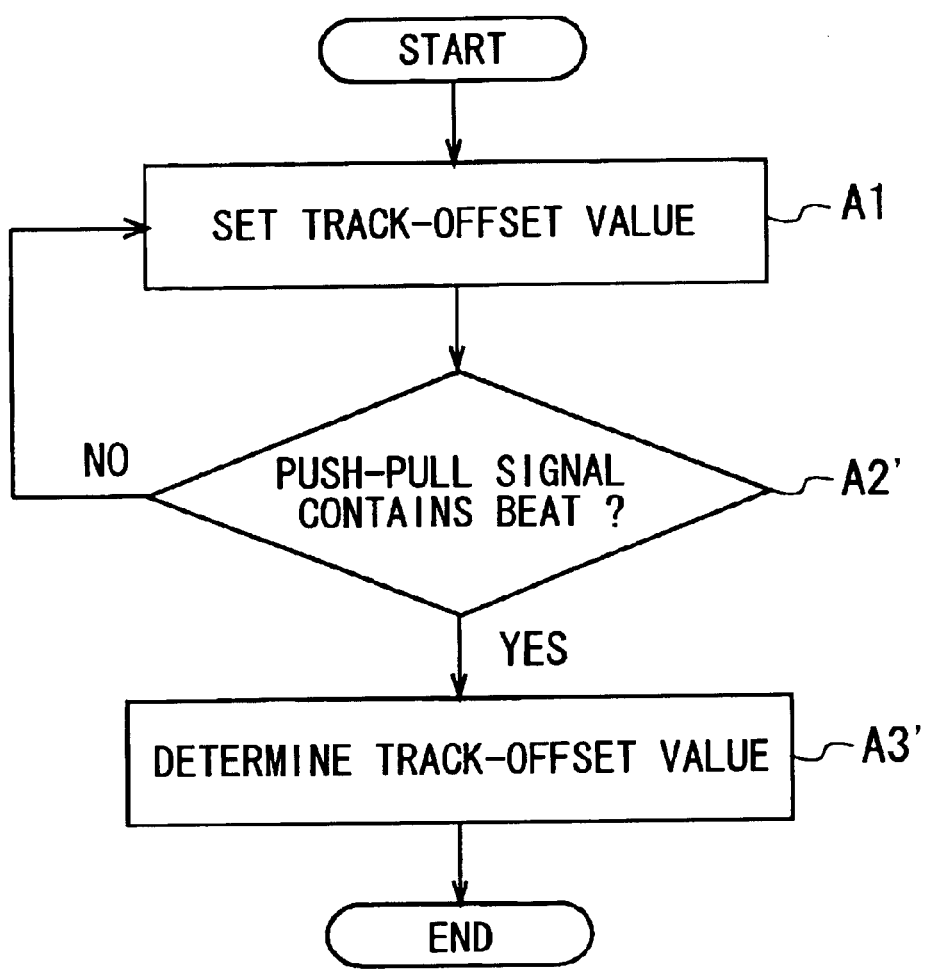

TRACK OFFSET COMPENSATION IN OPTICAL DISK DRIVES USING BEAT-INDUCING SIGNALS

BACKGROUND OF THE INVENTION

1. Field of the Invention

The present invention relates to a track-offset compensation technique in optical disk drives. More particularly, the invention relates to a method and a system for compensating the track offset in optical disk drives, which is applicable to high-density optical disks with wobbled grooves (i.e., optical disks using the groove wobble recording), and an optical disk drive using the method or system.

2. Description of the Related Art

Conventionally, optical disk drives utilize servo mechanism to control the laser beam irradiated from the optical head to an optical disk loaded in the focusing direction and the radial direction, thereby stabilizing the recording and reproducing (i.e., writing and reading) operations. Typically, the servo-control in the focusing direction is termed "focusing servo-control" while the servo-control the radial direction is termed "tracking servo-control".

With the "focusing servo-control" or "tracking servo-control" in an optical disk drive, an error signal is always detected during the operation of the drive. If the error signal is detected, the optical head is subjected to specific feedback control in such a way that the error signal thus detected has a specific value (typically, 0) Thus, the spot of the irradiated laser beam is controlled to satisfy the desired focusing and tracking conditions to thereby move along a desired track of the disk.

However, the error signal includes various offset factors. Therefore, even if the electrical error signal has a value of 0, the optical spot does not always scan through a desired point on the disk. As a result, it is necessary to eliminate all the offset factors or to implement proper feed-back control of the spot while taking these factors into consideration. In this case, the feed-back control needs to be performed in such a way that the error signal has a specific value not equal to 0. This control may be termed the "offset compensation" below.

The offset factors include various types of errors. Examples are positional deviation of the detector in the optical head; bias of the optical beam intensity; inclination between the optical head and the optical disk; surface unevenness of the optical disk; and offset in the electrical system. Thus, it is difficult to eliminate or remove all of these offset factors and to implement necessary servo-control mechanisms while considering all the factors.

Recently, several standards have been defined for Digital Versatile Disks (DVDs), such as DVD-R (Recordable), DVD-R/W (Recordable/Writable), DVD+RW (ReWritable), and DVD-RAM (Random-Access Memory), in the optical disk industry. These standards have been considered as particularly promising standards for next-generation, high-density optical disks and thus, vigorous developments have been being made on these types of optical disks.

Optical disks according to the above-described DVD standards have guiding grooves wobbled at a specific period. If the reflected light beam by the disk is reproduced using the so-called push-pull method, a "wobbling signal" having the same period as the wobbling period of the grooves is obtainable. Thus, the wobbling signal is used for example, to achieve the rotational synchronization of the spindle for rotating the disk and/or to generate the write clock for data writing operation. Considering this fact, a serious problem will occur if the wobbling signal is not well reproduced as desired.

In particular, for the optical disks according to the DVD+RW standard, the insufficient or inadequate reproduction of the wobbling signal leads to a critical problem. This is because part of the wobbling signal is inverted in phase in the disk of the DVD+RW type and at the same, time, specific address information or the like is buried in the positions thus phase-inverted. This method or disk structure is termed "ADIP".

It is known that the quality of the wobbling signal degrades largely after data is recorded or stored on the disk. This is because light and shade spots (or, marks and spaces) are created by the stored data. This badly affects the quality of the wobbling signal. Therefore, it is necessary for the wobbling signal to be synchronized with the period of the wobbled grooves even after data is stored on the disk. When the disks are of the DVD+RW type, a critical problem may occur if the wobbling signal is unable to be reproduced well. This is because the buried address information cannot be read out, in other words, the ADIP signal is not reproduced well.

It is known that the wobbling signal and the ADIP signal are highly sensitive to track offset. According to the inventor's test on the optical disk equivalent to the DVD+RW type, the relationship of the track offset with the synchronization of the wobbling signal with the wobbling period of the grooves and the block error rate (BLER) (where one block is equal to one ADIP word) of the ADIP signal was as follows:

When the track offset was set at the optimum position, the wobbling signal was synchronized with the wobbling period of the grooves and at the same time, the BLER of the ADIP signal was limited to approximately 60%. However, when the track offset was shifted from the optimum position by only approximately 0.02 $\mu$m, the synchronization of the wobbling signal was unable to be achieved and the BLER of the ADIP signal was raised to approximately 80%. At this time, the signal-to-noise ratio (SNR) of the wobbling signal was measured in a manner according to the EGMA standards. In this case, the SNR thus measured was approximately 38 dB not only when the track offset was set at the optimum position but also when the track offset was shifted from the optimum position by approximately 0.02 $\mu$m. This means that the value of the SNR changed scarcely even if the track offset varies within this range. In other words, such a minute change of the track offset greatly affects the synchronization of the wobbling signal and the BLER of the ADIP signal. As a result, the track offset needs to be well controlled with very high accuracy (i.e., the track offset needs to be optimized) even if no change is observed in the SNR of the wobbling signal due to minute deviation of the track offset.

One of the prior-art methods for eliminating or compensating the track offset is disclosed in the Japanese Non-Examined Patent Publication No. 2000-163765 published in 2000. In this method, wobbling pits for detecting the track offset are formed on the disk and then, the track offset is eliminated by using the signal generated by the wobbling pits.

Another prior-art method for compensating the track offset is disclosed in the Japanese Non-Examined Patent Publication No. 9-259455 published in 1997. In this method, the fact that the amplitude of the wobbling signal varies with the motion of the lens is utilized. The shift of the lens compensates for the track offset.

Further prior-art methods for eliminating or compensating the track offset are disclosed in the Japanese Patent. No. 2606509 issued on Feb. 13, 1997 (which corresponds to the Japanese Non-Examined Patent Publication No. 5-151600) and the Japanese Non-Examined Patent Publication No. 9-7200 published in 1997. In these two methods, the relationship of the track offset with the error rate of the wobbling signal or the ATIP (Absolute Time In Pregroove) signal is examined. Then, the track offset is adjusted at a position where the error rate thus examined is minimized.

With the above-described prior-art method for eliminating the track offset with the wobbling pits, which is disclosed in the Publication No. 2000-163765, it is necessary to form the wobbling pits, which decreases the formatting efficiency and the storing capacity of the disk. Moreover, the formation of the wobbling pits is not adopted in the current DVD standards and thus, this method does not have desired versatility.

With the above-described prior-art method for compensating the track offset with the lens shift, which is disclosed in the Publication No. 9-259455, offset factors other than the lens shift are unable to be considered. Thus, the track offset is not completely corrected.

With the above-described prior-art methods for eliminating the track offset with the wobbling pits, which are disclosed in the Patent No. 2606509 and the Publication No. 9-7200, the error rate is actually measured. Therefore, the stored signal on the disk needs to be sampled at lease $10^6$ times if the error rate is approximately $10^{-5}$. Thus, it takes a very long time for track-offset compensation.

SUMMARY OF THE INVENTION

Accordingly, an object of the present invention is to provide a method and a system for compensating track offset in an optical disk drive that achieves complete compensation of the track offset, and an optical disk drive using the method or system.

Another object of the present invention is to provide a method and a system for compensating track offset in an optical disk drive that optimize the track offset, and an optical disk drive using the method or system.

Still another object of the present invention is to provide a method and a system for compensating track offset in an optical disk drive that reduces the compensation time for the track offset, and an optical disk drive using the method or system.

The above objects together with others not specifically mentioned will become clear to those skilled in the art from the following description.

According to a first aspect of the invention, a method for compensating track offset in an optical disk drive is provided.
This method comprises:
(a) providing an optical disk with wobbled grooves;
the wobbled grooves being used for generating a wobbling signal with a wobbling period;
(b) recording a beat-inducing signal on the disk;
a period of the beat-inducing signal having a specific relationship with the wobbling period in such a way that a beat signal is induced by the beat-inducing signal and the wobbling signal;
c) generating a tracking-error signal using a push-pull method by optically reading the wobbled grooves of the disk and the beat-inducing signal recorded on the disk;
the tracking-error signal containing a beat signal induced by the beat-inducing signal and the wobbling signal; and
(d) compensating track offset based on the beat signal contained in the tracking-error signal.

With the method for compensating track offset in an optical disk drive according to the first aspect of the invention, first, an optical disk with wobbled grooves is provided. The wobbled grooves are used for generating a wobbling signal with a wobbling period. Next, a beat-inducing signal is recorded on tie disk. The period of the beat-inducing signal having a specific relationship with the wobbling period in such a way that a beat signal is induced by the beat-inducing signal and the wobbling signal. By optically reading the wobbled grooves of the disk and the beat-inducing signal recorded on the disk, a tracking-error signal it generated using a push-pull method. The tracking-error signal contains a beat signal induced by the beat-inducing signal and the wobbling signal. Thereafter, track offset is compensated based on the beat signal contained in the tracking-error signal. Accordingly, complete compensation of the track offset is achieved. In other words, the track offset is optimized.

Moreover, there is no need to perform the sampling operation for the tracking-error signal many times. Thus, the compensation time for the tract offset is reduced.

In a preferred embodiment of the method according to the first aspect of the invention, the period of the beat-inducing signal is set at a value within a range from 0.85 to 1.25 times as much as a period of the wobbling signal.

In another preferred embodiment of the method according to the first aspect of the invention, a level of the beat signal is compared with a first reference level and a second reference level in the step (d) of compensating track offset, where the first reference level is different from the second reference level. If the level of the beat signal has a first relationship with the first reference level and a second relationship with the second reference level, the beat signal is determined as good.

In still another preferred embodiment of the method according to the first aspect of the invention, a dc component of the beat signal is extracted. The track-offset value is set in such a way that the dc component of the beat signal is set at a specific level. It is preferred that the specific level is approximately zero.

According to a second aspect of the invention, another method for compensating track offset in an optical disk drive is provided. This method comprises:
(a) providing an optical disk with wobbled grooves and a beat-inducing signal;
the wobbled grooves being used for generating a wobbling signal with a wobbling period;
a period of the beat-inducing signal having a specific relationship with the wobbling period in such a way that a beat signal is induced by the beat-inducing signal and the wobbling signal;
(b) generating a tracking-error signal using a push-pull method by optically reading the wobbled grooves and the beat-inducing signal recorded of the disk;
the tracking-error signal containing a beat signal induced by the beat-inducing signal and the wobbling signal; and
(c) compensating track offset based on the bea signal contained in the tracking-error signal.

With the method for compensating track offset in an optical disk drive according to the second aspect of the invention, the same steps as those in the method of the first aspect are carried out, except that the beat-inducing signal is formed on the disk in advance. Therefore, because of the same reason as the method of the first aspect, the same advantages as those in the method of the first embodiment are obtainable.

In a preferred embodiment of the method according to the second aspect of the invention, the period of the beat-inducing signal is set at a value within a range from 0.85 to 1.25 times as much as a period of the wobbling signal.

In another preferred embodiment of the method according to the second aspect of the invention, a level of the beat signal is compared with a first reference level and a second reference level in the step (c) of compensating track offset, where the first reference level is different from the second reference level. If the level of the beat signal has a first relationship with the first reference level and a second relationship with the second reference level, the beat signal is determined as good.

In still another preferred embodiment of the method according to the second aspect of the invention, a dc component of the beat signal is extracted. The track-offset value is set in such a way that the dc component of the beat signal is set at a specific level. It is preferred that the specific level is approximately zero.

According to a third aspect of the invention, a system for compensating track offset in an optical disk drive is provided. This system comprises:
(a) means for recording a beat-inducing signal on an optical disk with wobbled grooves;
the wobbled grooves being used for generating a wobbling signal with a wobbling period;
a period of the beat-inducing signal having a specific relationship with the wobbling period in such a way that a beat signal is induced by the beat-inducing signal and the wobbling signal;
(b) means for generating a tracking-error signal using a push-pull method by optically reading the wobbled grooves of the disk and the beat-inducing signal recorded on the disk;
the tracking-error signal containing a beat signal induced by the beat-inducing signal and the wobbling signal; and
(c) means for compensating track offset based on the beat signal contained in the tracking-error signal.

With the system for compensating the track offset in an optical disk drive according to the third aspect of the invention, because of the same reason as shown in the method of the first aspect, the same advantages as those in the method of the first aspect are obtainable.

In a preferred embodiment of the system according to the third aspect of the invention, the period of the beat-inducing signal is set at a value within a range from 0.85 to 1.25 times as much as a period of the wobbling signal.

In another preferred embodiment of the system according to the third aspect of the invention, a level of the beat signal is compared with a first reference level and a second reference level in the means for compensating track offset, where the first reference level is different from the second reference level. If the level of the beat signal has a first relationship with the first reference level and a second relationship with the second reference level, the beat signal is determined as good.

In still another preferred embodiment of the system according to the third aspect of the invention, a filter is additionally provided to extract a dc component of the beat signal. The track offset value is set in such a way that the dc component of the beat signal is set at a specific level. It is preferred that the specific level is approximately zero.

According to a fourth aspect of the invention, another system for compensating track offset in an optical disk drive is provided. This system comprises:

(a) means for generating a tracking-error signal using a push-pull method by optically reading wobbled grooves of an optical disk and a beat-inducing signal recorded on the disk;
the wobbled grooves being used for generating a wobbling signal with a wobbling period;
a period of the beat-inducing signal having a specific relationship with the wobbling period in such a way that a beat signal is induced by the beat-inducing signal and the wobbling signal;
the tracking-error signal containing a beat signal induced by the beat-inducing signal and the wobbling signal; and
(b) means for compensating track offset based on the beat signal contained in the tracking-error signal.

With the method for compensating track offset in an optical disk drive according to the fourth aspect of the invention, because of the same reason as shown in the method of the second aspect, the same advantages as those in the method of the second aspect are obtainable.

In a preferred embodiment of the system according to the fourth aspect of the invention, the period of the beat-inducing signal is set at a value within a range from 0.85 to 1.25 times as much as a period of the wobbling signal.

In another preferred embodiment of the system according to the fourth aspect of the invention, a level of the beat signal is compared with a first reference level and a second reference level in the means for compensating track offset, where the first reference level is different from the second reference level. If the level of the beat signal has a first relationship with the first reference level and a second relationship with the second reference level, the beat signal is determined as good.

In still another preferred embodiment of the system according to the fourth aspect of the invention, a filter for extracting a dc component of the beat signal is additionally provided. The track-offset value is set in such a way that the dc component of the beat signal is set at a specific level. It is preferred that the specific level is approximately zero.

According to a fifth aspect of the invention, an optical disk drive is provided. This drive comprises the system according to the third or fourth aspect of the invention.

BRIEF DESCRIPTION OF THE DRAWINGS

In order that the present invention may be readily carried into effect, it will now be described with reference to the accompanying drawings.

FIG. 1 is a schematic, functional block diagram showing the configuration of an optical disk drive according to an embodiment of the invention, where a track-offset compensation system according to the invention is built in.

FIG. 2 is a flowchart showing the operation of the track-offset compensation system built in the optical disk drive according to the first embodiment of FIG. 1.

FIG. 14 is a functional block diagram showing the second checking method of determining whether the push-pull signal contains a good beat signal or not used in the beat-signal checker in the drive according to the embodiment of FIG. 1.

FIGS. 15A and 15B are waveform diagrams showing the waveforms of the beat signal contained in the push-pull signal (i.e., the tracking error signal) after filtering operation for explaining the second checking method of determining whether the push-pull signal contains a good beat signal or nor used in the beat-signal checker in the drive according to the embodiment of FIG. 1, respectively.

FIG. 16 is a flowchart showing the operation of a variation of the track-offset compensating system built in the optical disk drive according to the embodiment of FIG. 1.

DETAILED DESCRIPTION OF THE PREFERRED EMBODIMENTS

Figure 1:
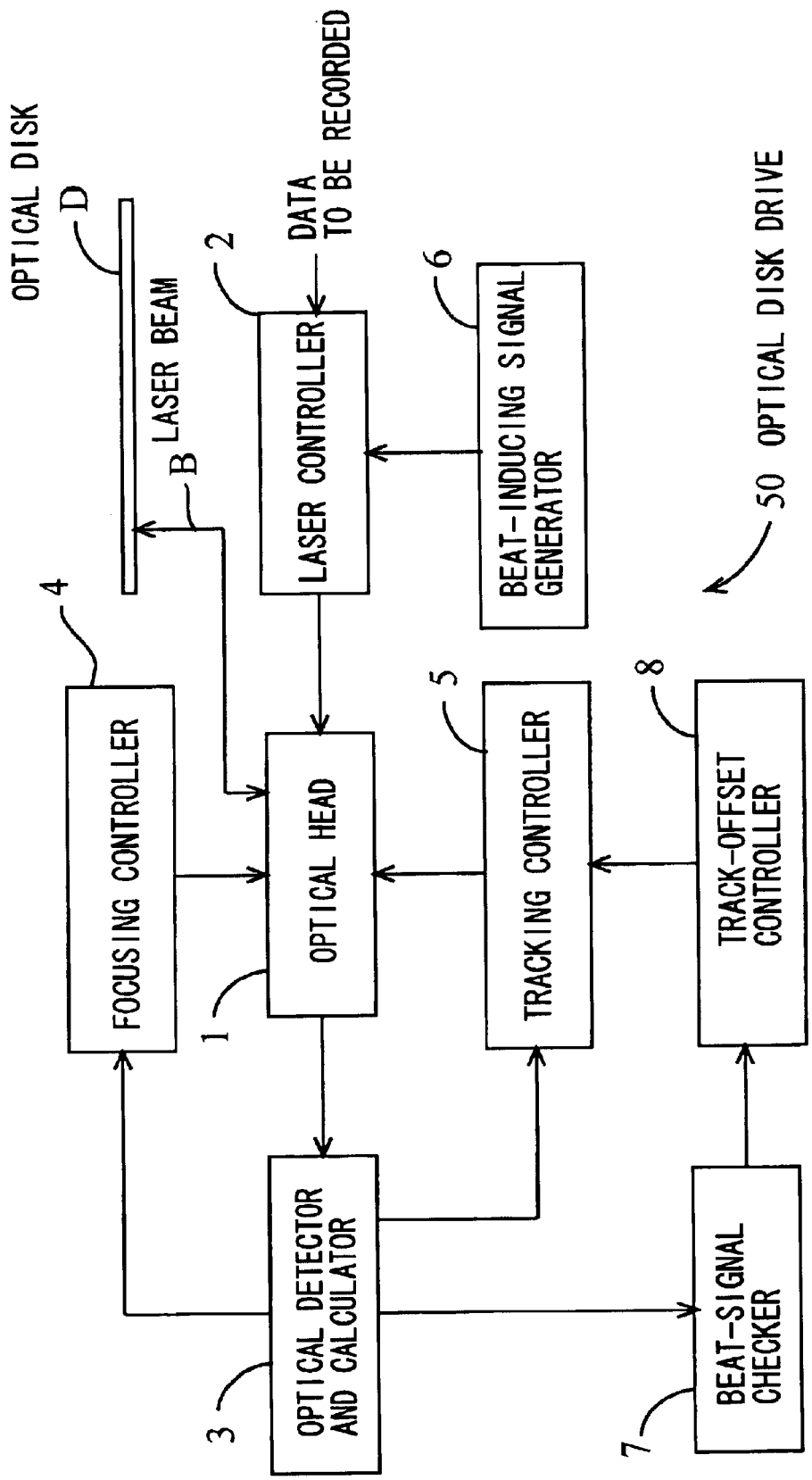

Preferred embodiments of the present invention will be described in detail below while referring to the drawings attached.

First Embodiment

An optical disk drive 50 according to an embodiment of the invention has the configuration as shown in FIG. 1. drive 50 is equipped with a track-offset compensation system according to the invention.

FIG. 1 the optical disk drive 50 of the embodiment comprises an optical head 1, a laser controller 2, an optical detector and calculator 3, a focusing controller 4, a tracking controller 5, a beat-inducing signal generator 6, a beat-signal checker 7, a track-offset controller 8.

The optical head 1, in the recording (or, writing) operation, receives an external data to be recorded on an optical disk D loaded into the drive 50 and irradiates a laser beam B to the disk D, thereby recording the data on the disk D. In the reproducing (or, reading) operation, the head 1 irradiates the laser beam B to the disk D and receives the reflected beam B by the disk D, thereby reproducing the data stored on the disk D. The data thus reproduced is supplied to the optical detector and calculator 3.

The optical disk D has wobbled grooves (not shown), which are used for generating a wobbling signal with a wobbling period.

The laser controller 2 controls the operation of the laser (not shown) as a light source mounted on the head 1. Specifically, the controller 2 receives the external data to be recorded, converts it to a laser-driving signal, and sends the laser-driving signal thus converted to the head 1. Moreover, the controller 2 receives a beat-inducing signal generated by the beat-inducing signal generator 6, converts it to an additional laser-driving signal, and sends the additional laser-driving signal to the head 1. In response to these two laser-driving signals, the head 1 drives the laser to irradiate the laser beam B to the disk D.

The period of the beat-inducing signal has a specific relationship with the wobbling period in such a way that a beat signal is induced by the beat-inducing signal and the wobbling signal.

The optical detector and calculator 3 receives or detects the output signal from the head 1 in the recording or reproduction operation, thereby generating a focusing control signal and a tracking control signal through specific calculation. The tracking control signal is generated by using the so-called "push-pull method" and therefore, it may be termed the "push-pull signal" below. The section 3 sends the focusing control signal to the focusing controller 4 and at the same time, it sends the tracking control signal (i.e., the push-pull signal) to the tracking controller 5 and the beat-signal checker 7. The tracking control signal or the push-pull signal, which is a signal for detecting the wobbling signal from the disk D, is used for track-offset compensation and tracking control.

The method of generating the tracking control signal (i.e., detecting the tracking error of the laser beam B) using the push-pull method is well known. For example, it is disclosed in the previously-referred Japanese Non-Examined Patent Publication No. 2000-163765. Therefore, it is not explained here.

The focusing controller 4 generates a focus-compensation signal based on the focusing signal sent from the optical detector and calculator 3 and then, sends it to the head 1. The focus-compensation signal is used to compensate the focusing error of the spot of the laser beam B on the disk D.

The tracking controller 5 controls and adjusts the tracking operation of the head 1 (i.e., the laser beam B) based on the tracking control signal (i.e., the push-pull signal) sent from the optical detector and calculator 3 and the track-offset signal sent from the track-offset controller 8.

The beat-inducing signal generator 6 generates the beat-inducing signal. When the beat-inducing signal is recorded on the disk D and reproduces the same with the beam B from the head 1, the push-pull signal or tracking control signal is generated. The tracking control signal thus generated includes a "beat signal", which is formed by interference between the wobbling signal and the beat-inducing signal. The detailed condition on the periods of the beat-inducing signal and the wobbling signal is explained later.

The beat-signal checker 7 checks or judges whether or not the push-pull signal (i.e., the cracking control signal) contains a specific, predetermined beat. If the checker 7 judges the push-pull signal does not contain a predetermined beat, the checker 7 instructs the track-offset controller 8 to change the current value of the track offset. On the other hand, if the checker 7 judges the push-pull signal contains a predetermined beat, the checker 7 instructs the controller 8 to determine or fix the current value of the track offset.

The track-of set controller 8 sends the track-offset signal to the tracking controller 5. The track-offset signal contains a track-offset value, which is set or assigned by the controller 8. The controller 8 keeps or changes the track-offset value according to the instruction from the beat-signal checker 7.

Next, the operation of the track-offset compensation system built in the optical disk drive 50 according to the embodiment of FIG. 1 is explained below with reference to the flowchart of FIG. 2.

First, in the step A1 of FIG. 2, the track-offset controller 8 sets or assigns the track offset at a specific value (i.e., an initial value).

Subsequently, in the step A2 of FIG. 2, the tracking controller 5 adjusts the position of the optical head 1 according to the value of the track offset set or assigned by the track-offset controller 8. The laser controller 2 controls the operation of the laser mounted on the head 1 responsive to the beat-inducing signal sent from the beat-inducing signal generator 6. Thus, the beat-inducing signal is recorded on the disk D with the laser beam B. From the viewpoint of track-offset compensation, it is sufficient that the beat-inducing signal is recorded on only a part of the disk D.

When the beat-inducing signal thus recorded is reproduced with the use of the laser beam B, the push-pull signal (i.e., the tracking control signal) is generated by the optical detector and calculator 3. The push-pull signal thus generated contains a beat signal with a specific period. This beat signal is induced by optical interference between the optically reproduced beat-inducing signal and the optically reproduced wobbling signal. Thus, the period of the beat-inducing signal has a specific relationship with the wobbling period in such a way that a beat signal is induced by the beat-inducing signal and the wobbling signal.

If the push-pull signal (i.e., the tracking control signal) is generated by the optical detector and calculator 3 without the beat-inducing signal, the push-pull signal contains no beat signal. The push-pull signal contains only the wobbling signal according to the wobbled grooves of the disk D.

In the step A3 of FIG. 2, the beat-signal checker 7 checks or judges whether or not the push-pull signal thus generated contains a predetermined beat signal. If the push-pull signal does not contain a predetermined beat signal, i.e., if the result of the judgment in the step A3 is "No", the flow is returned to the step A1 and the offset controller 8 sets the track offset at a different value from the initial value. Thereafter, the steps A1 to A3 are carried out again. These steps A1 to A3 are repeated until the result of the judgment in the step A3 is "Yes".

On the other hand, if the push-pull signal thus generated contains a predetermined beat signal, i.e., if the result of the judgment in the step A3 is "Yes ", the flow is progressed to the step A4. In the step A4, the beat-signal checker 7 instructs the track-offset controller 8 to fix the track offset at the current value. In other words, the value of the track-offset is determined in the step A4. In this way, the operation of the track-offset compensation system built in the drive 50 is completed.

In addition, if the optical disk D contains a location or part where the beat-inducing signal has been recorded, the operation for track-offset compensation can be carried out by moving the optical head 1 to the location or part to read the beat-inducing signal thus recorded therein. In this case, the step A2 of recording the beat-inducing signal on the disk D is unnecessary. This is a variation of the operation of the track-offset compensation system built in the drive 50, the flow of which is shown in FIG. 16.

As explained above, with the above-described track-offset compensation system of the embodiment of the invention, when the push-pull signal does not contain the specific, desired beat signal, the beat-inducing signal is recorded on the disk D necessary times while changing the value of the track-offset until the push-pull signal contains the specific, desired beat signal. However, when the wobbling signal on the disk D has a large amplitude, it may be sufficient to optimize the value of the track offset in only the reproduction operation, even if the track-offset value is not correctly optimized. In this case, after the beat-inducing signal is recorded on the disk D of this type once, the reproduction operation can be well conducted only by changing the track-offset value. Therefore, the step A2 of recording the beat-inducing signal on the disk D may be canceled, as shown in FIG. 16.

However, if the track offset is set at an excessive value when the beat-inducing signal is recorded on the disk D for the first time, the step A2 is unable to be canceled.

Figure 3A:
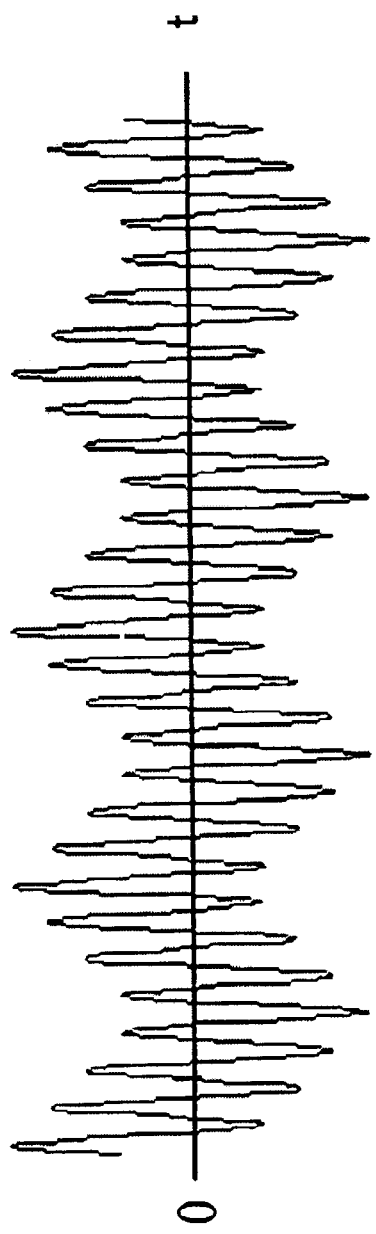
FIG. 3A is a waveform diagram showing the waveform of the push-pull signal (i.e., the tracking error signal) that contains a good beat signal, which is checked in the beat-signal checker of the drive according to the first embodiment of FIG. 1.
Figure 3B:
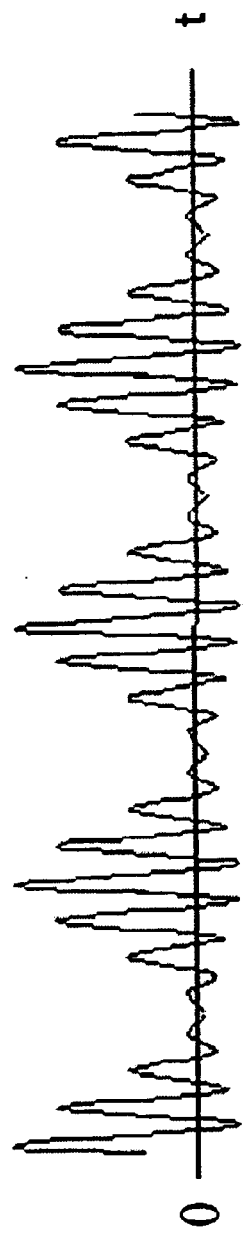
FIG. 3B is a waveform diagram showing the waveform of the push-pull signal (i.e., the tracking error signal) that contains a no-good beat signal, which is checked in the beat-signal checker of the drive according to the first embodiment of FIG. 1.
Figure 4:
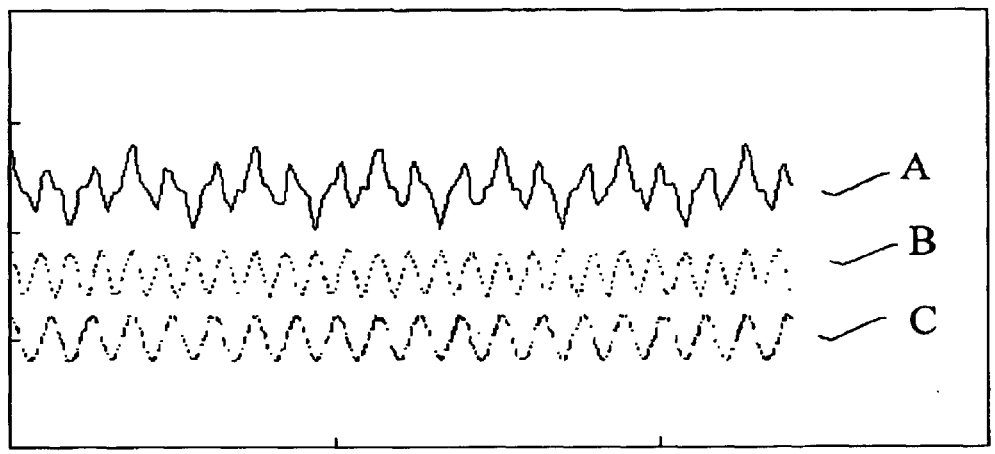
FIG. 4 is a waveform diagram showing the waveforms of the wobbling signal (C), the beat-inducing signal (B), and the beat signal (A) contained in the push-pull signal (i.e., the tracking error signal) used in the drive according to the embodiment of FIG. 1, where the period of the beat-inducing signal is 0.75 times as much as the period of the wobbling signal.
Figure 5:
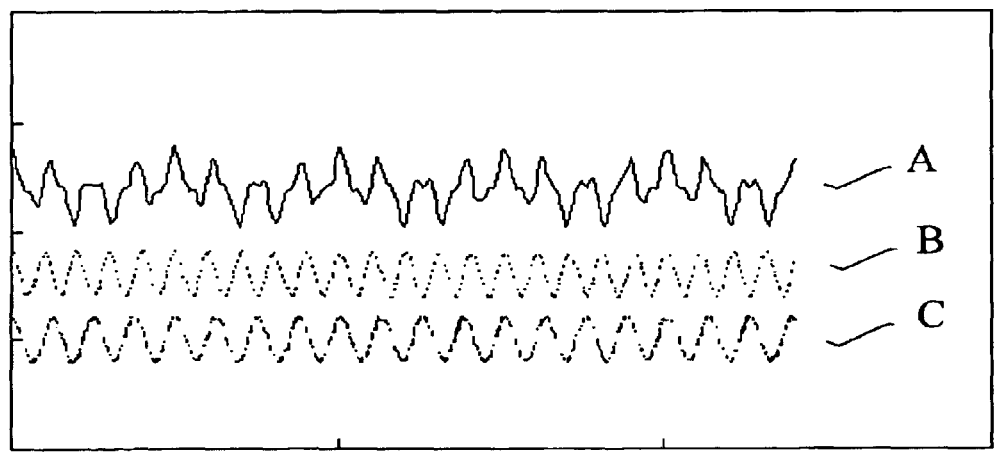
FIG. 5 is a waveform diagram showing the waveforms of the wobbling signal (C), the beat-inducing signal (B), and the beat signal (A) contained in the push-pull signal (i.e., the tracking error signal) used in the drive according to the embodiment of FIG. 1, where the period of the beat-inducing signal is 0.80 times as much as the period of the wobbling signal.
Figure 6:
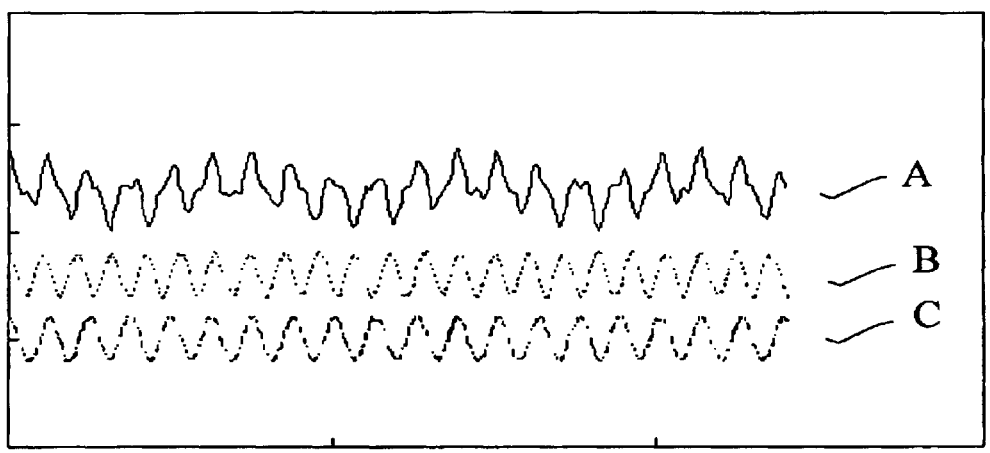
FIG. 6 is a waveform diagram showing the waveforms of the wobbling signal (C), the beat-inducing signal (B), and the beat signal (A) contained in the push-pull signal (i.e., the tracking error signal) used in the drive according to the embodiment of FIG. 1, where the period of the beat-inducing signal is 0.85 times as much as the period of the wobbling signal.
Figure 7:
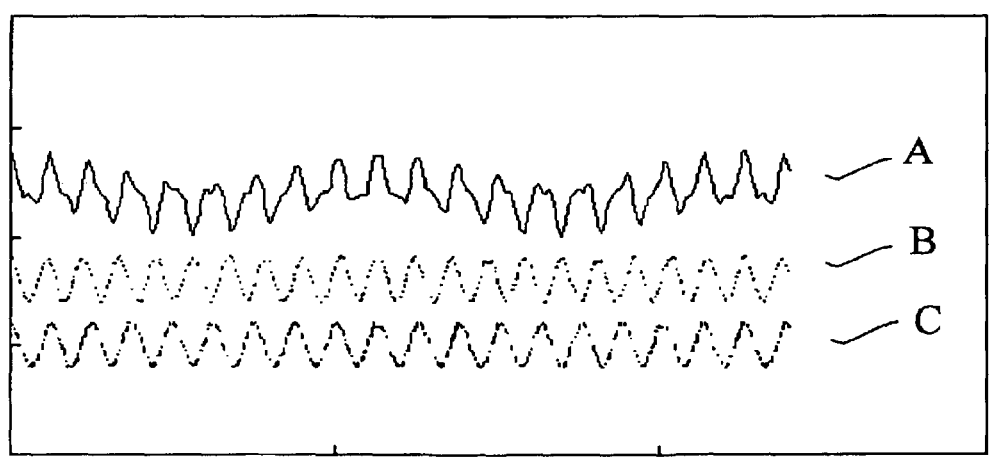
FIG. 7 is a waveform diagram showing the waveforms of the wobbling signal (C), the beat-inducing signal (B), and the beat signal (A) contained in the push-pull signal (i.e., the tracking error signal) used in the drive according to the embodiment of FIG. 1, where the period of the beat-inducing signal is 0.90 times as much as the period of the wobbling signal.
Figure 8:
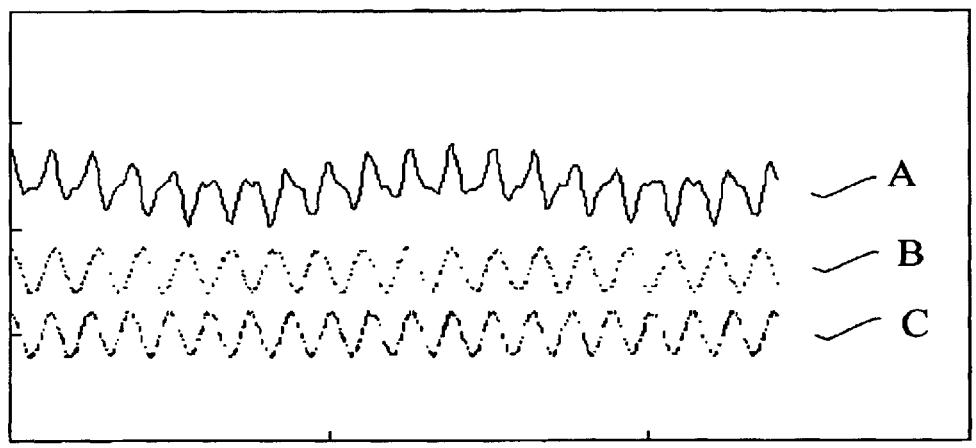
FIG. 8 is a waveform diagram showing the waveforms of the wobbling signal (C), the beat-inducing signal (B), and the beat signal (A) contained in the push-pull signal (i.e., the tracking error signal) used in the drive according to the embodiment of FIG. 1, where the period of the beat-inducing signal is 1.10 times as much as the period of the wobbling signal.
Figure 9:
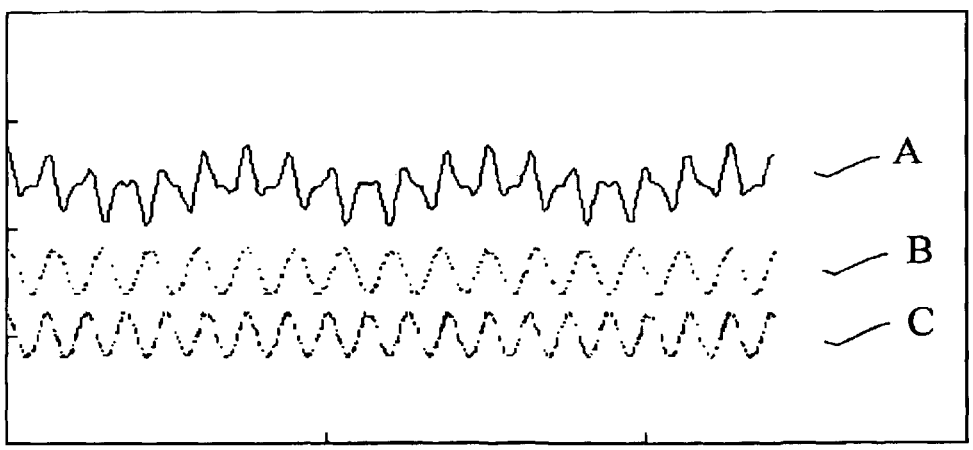
FIG. 9 is a waveform diagram showing the waveforms of the is wobbling signal (C), the beat-inducing signal (B), and the beat signal (A) contained in the push-pull signal (i.e., the tracking error signal) used in the drive according to the embodiment of FIG. 1, where the period of the beat-inducing signal is 1.20 times as much as the period of the wobbling signal.
Figure 10:
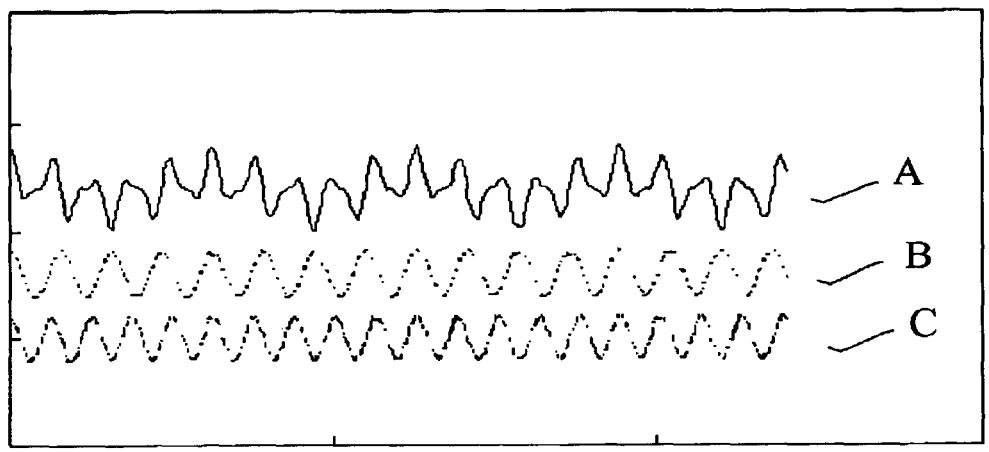
FIG. 10 is a waveform diagram showing the waveforms of the wobbling signal (C), the beat-inducing signal (B), and the beat signal (A) contained in the push-pull signal (i.e., the tracking error signal) used in the drive according to the embodiment of FIG. 1, where the period of the beat-inducing signal is 1.25 times as much as the period of the wobbling signal.
Figure 11:
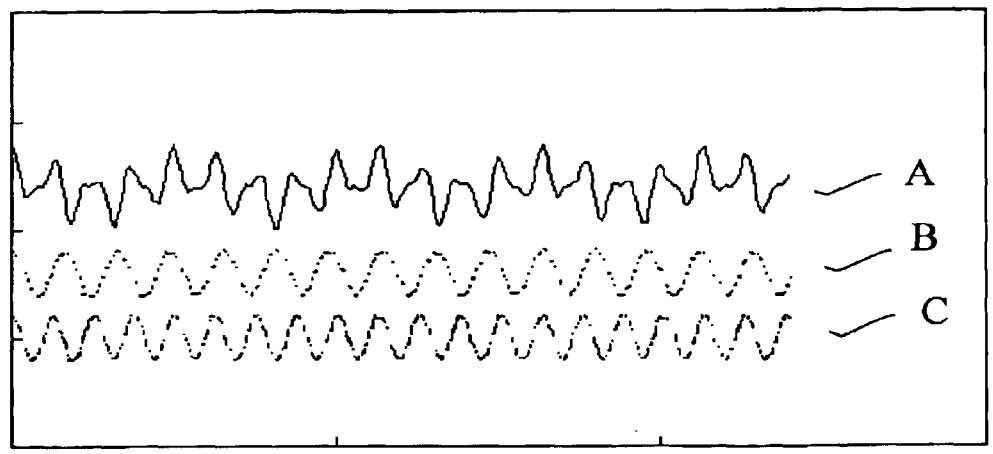
FIG. 11 is a waveform diagram showing the waveforms of the wobbling signal (C), the beat-inducing signal (B), and the beat signal (A) contained in the push-pull signal (i.e., the tracking error signal) used in the drive according to the embodiment of FIG. 1, where the period of the beat-inducing signal is 1.30 times as much as the period of the wobbling signal.
Figure 12:
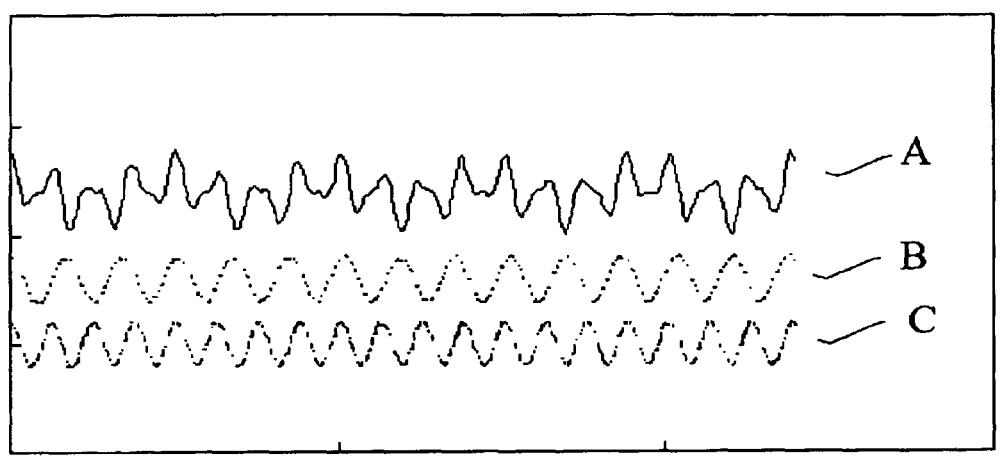
FIG. 12 is a waveform diagram showing the waveforms of the wobbling signal (C), the beat-inducing signal (B), and the beat signal (A) contained in the push-pull signal (i.e., the tracking error signal) used in the drive according to the embodiment of FIG. 1, where the period of the beat-inducing signal is 1.35 times as much as the period of the wobbling signal.

An example of the push-pull signal (i.e., the tracking control signal) with a desired, good beat signal is shown in FIG. 3A in which the waveform of the beat signal (i.e., envelope) of the push-pull signal is approximately sinusoidal and approximately symmetrical with respect to the level-0 line. On the other hand, an example of the push-pull signal with an undesired, no-good beat is shown in FIG. 3B, in which the beat signal (i.e., envelope) of the push-pull signal is unlike sinusoidal and the waveform is biased upward with respect to the level-0 line. This is due to the following reason. In FIGS. 3A and 3B, the lateral axis is time and longitudinal axis is the level or amplitude.

If the recording mark is located on the center line of a track of the disk D, the mark affects equally the wobbling signal regardless of whether the grooves are wobbled toward the right or left side of the track. In contrast, if the recording mark is not located on the center line of a track of the disk D (i.e., some tracking error exists), the mark affects unequally the wobbling signal dependent of whether the grooves are wobbled toward the right or left side of the track. Typically, the recording mark has a low reflectance for the laser beam B and therefore, the output level of the wobbling signal (i.e., the intensity of the reflected beam B) is higher when the laser beam B is reflected at the non-wobbled locations than that when the beam B is reflected at the wobbled locations. As a result, the output level of the wobbling signal decreases at the wobbled side and increases at the opposite side.

Since the object to be compensated is the push-pull signal or the tracking control signal in the invention, the wobbling signal varies both on the upper and lower sides of the 0-level line according to the wobbling state of the grooves. Thus, if the output level of the wobbling signal is high, the absolute value or amplitude of the wobbling signal with respect to the 0-level line is large.

Next, the period of the beat-inducing signal is explained below.

Basically, as described in textbooks on physics, a beat signal is generated if the period of the wobbling signal is close to the period of the beat-inducing signal. Naturally, no beat will occur if their periods are equal. Moreover, the object to be detected is not an interfered signal between two simple signals but an interfered signal of the push-pull signal with the beat-inducing signal added. Therefore, the dominant equation differs slightly.

If the period of the wobbling signal is T1 and the period of the beat-inducing signal is T2, the beat signal between the wobbling and recording signals is proportional to $$\cos(1/T1)*[\cos(1/T2)-1],$$

where "$\cos(1/T1)$" means the wobbling signal and "$[\cos(1/T2)-1]$" means the beat-inducing signal. This means that the beat signal is expressed as the product of the wobbling signal and the beat-inducing signal.

When the ratio of the period T2 to the period T1 (i.e., T2/T1) is changed from 0.75 to 1.35, the waveforms are given as shown in FIGS. 4 to 12. These waveforms were obtained by calculation by the inventor. In each of FIGS. 4 to 12, the character "A" indicates the beat signal, the character "B" indicates the beat-inducing signal, and the character "C" indicates the wobbling signal. The level-0 lines for these signals are different from each other.

As seen from FIGS. 4 to 12, if the value of (T2/T1) was in the range from 0.85 to 1.25, the beat signal (A) had a longer period than the period of the wobbling signal (C). However, if the value of (T2/T1) was out of this range, any clear beat was not observed. As a result, it was seen that the period T2 of the recording signal was preferably set at a value within the range from 0.85 to 1.25 times as much as the period T1 of the wobbling signal, i.e., T2=(0.85–1.25)× T1.

As explained above, in the embodiment of the invention, the beat-inducing signal is added to the wobbling signal to form the tracking control signal (i.e , the push-pull signal) that contains a beat signal. Therefore, the level (i.e., amplitude) of the push-pull or tracking control signal varies distinctively according to whether the recording marks corresponding to the beat-inducing signal exist or not on the disk D due to the beat signal. Accordingly, it is very easy to observe the current state of the track offset with the use of the beat signal observed. This physical phenomenon represents the feature of the invention.

The period of the beat signal may be set at any value if it satisfies the above-described beat-inducing condition or requirement. However, if the period of the beat signal is too long, the detection operation of the beat signal necessitates very long time. According to the inventor's tests, it was found that the period of the beat signal is set at a value approximately ten times as much as the period (T1) of the wobbling signal. If so, easiness for the beat-signal detection and temporal length therefor are kept in balance.

Figure 13A:
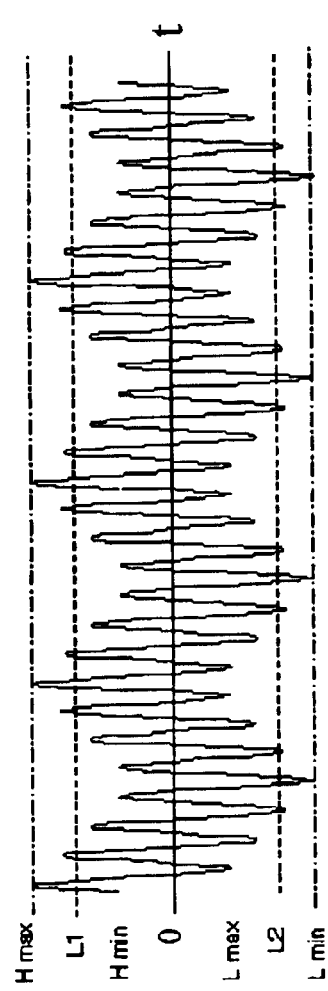
FIGS. 13A and 13B are waveform diagrams of the push-pull signal (i.e, the tracking error signal) for explaining the first checking method of determining whether the push-pull signal contains a good beat signal or not used in the beat-signal checker in the drive according to the embodiment of FIG. 1, respectively.
Figure 13B:
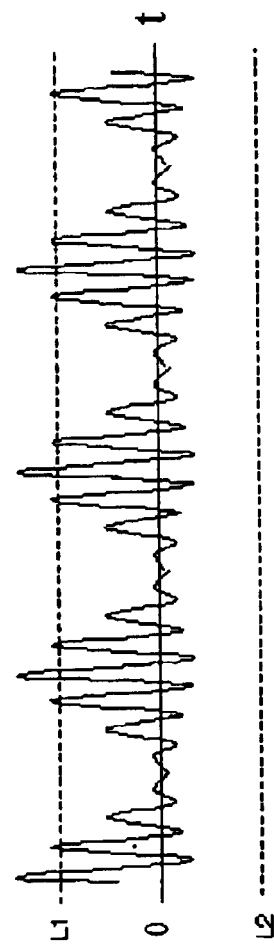

FIGS. 13A and 13B show a method to determine whether the beat signal is good or not conducted by the beat-signal checker 7, which is termed the "first determination method" here.

If the push-pull or tracking control signal has a desired, good beat, it has a waveform as shown in FIG. 13A. This means that the beat signal (i.e., envelope) or the push-pull signal has an approximately sinusoidal waveform, which is approximately symmetrical with respect to the level-0 line. On the other hand, if the push-pull signal has an undesired, no-good beat, it has a waveform as shown in FIG. 13B. This means that the beat signal of the push-pull signal has a non-sinusoidal waveform, which is biased upward with respect to the level-0 line.

Accordingly, If the level of the push-pull signal exceeds the positive threshold level L1 and at the same time, it falls below the negative threshold level L2, as shown in FIG. 13A, it is judged that this signal contains a good beat signal. If the level of the push-pull signal exceeds the positive threshold level L1 but it does not fall below the negative threshold level L2, as shown in FIG. 13B, or vice versa, it is judged that this signal does not contain any good beat signal. This judgment or determination can be realized easily by using a level-judgment device or circuit, such as a comparator.

As shown in FIG. 13A, the upper threshold level L1 is set between the positive maximum value Hmax of the upper envelope of the push-pull signal and the positive minimum value Hmin thereof. The lower threshold level L2 is set between the negative maximum value Lmax of the lower envelope of the signal and the lower minimum value Lmin thereof.

Because of fluctuation of the optical head 1 caused through is fabrication processes, there is a possibility that the level of the push-pull signal is maximized at an unsuitable location where the track offset is not optimized. In this case, the amplitude or level of the no-good beat signal may be greater than that of the good beat signal and as a result, the level of the no-good beat signal may exceed the upper threshold level L1 and fall below the lower threshold level L2. This degrades the accuracy of the "first determination method". To cope with this situation, it is preferred that the beat-signal checker 7 comprises a function of comparing the phases of the beat signal at which it intersects the threshold levels L1 and L2 with each other. This is due to the following reason.

As clearly seen from FIGS. 13A and 13B, the level of the good beat signal intersects the upper and lower threshold levels L1 and L2 at different phases from each other by 180°. In contrast, the level of the no-good beat signal intersects the threshold levels L1 and L2 at approximately the same phase. Therefore, the accuracy of the "first determination method" is prevented from degrading by utilizing this phenomenon or fact.

FIGS. 14 and 15 show a method to determine whether the beat signal is good or not conducted by the beat-signal checker 7, which is termed the "second determination method" here.

As explained before with reference FIGS. 3A and 3B, the push-pull signal with a desired, good beat contains a beat signal with an approximately sinusoidal and approximately symmetrical waveform. On the other hand, the push-pull signal with an undesired, no-good beat contains a beat signal with a non-sinusoidal and biased waveform. Accordingly, if the beat signal is subjected to a filtering operation to extract or collect the dc component with a filter 11, as shown in FIG. 14, whether the beat signal contained in the push-pull signal is good or not can be determined.

Since the good beat signal contains an approximately sinusoidal and approximately symmetrical waveform, it contains substantially no dc component, as shown in FIG. 15A. On the other hand, the no-good beat signal contains a non-sinusoidal and asymmetrical waveform and therefore, it contains finite (non-zero) dc component, as shown in FIG. 15B. Thus, using the dc component of the filtered beat signal, whether the beat signal is good or not can be determined.

If the wobbled grooves on the disk D are not formed well, a slight dc component will remain even if the beat signal is good. In this case, by adjusting the dc level of the filtered beat signal properly, the "second determination method" is still effective.

Even if the above-described track-offset compensation system of the embodiment of the invention is mounted in any optical disk drive other than the drive 50, the track offset can be always compensated by simply recording the beat-inducing signal on the disk D prior to recording operation of an external data. Alternately, if the disk D used contains a part that generates the beat-inducing signal, the track offset can be always compensated by reproducing the beat-inducing signal at the same part of the disk D in the drive. Therefore, any desired data can be stored on the disk D and reproduces it therefrom at an optimum track offset by the drive.

If the offset factors dependent on the disk D are not many, it is sufficient for the drive 50 of the embodiment to compensate the track offset only once using an optical disk. If so, there is no need for the drive 50 to perform any track-offset compensation later. The drive 50 can be used in this way.

Furthermore, if the drive 50 handles an optical disk without any wobbled grooves (i.e., a wobbled-groove-less optical disk), wobbled grooves are added to the wobbled-groove-less disk, thereby forming an optical disk with wobbled grooves having the same configuration as the wobbled-groove-less disk. This process may be carried out in the drive 50. Thereafter, the track offset of the drive 50 is compensated using the optical disk with wobbled grooves thus formed. In this case, the track-offset compensation system is applicable to optical disk drives designed for recording and reproducing wobbled-groove-less optical disks. Although it is unlike prevention of wobbling signal degradation, the reliability of the beat-inducing signal is enhanced because the beat-inducing signal can be recorded on the disk without any track offset.

With the optical disk drive 50 according to the embodiment of the invention, the beat-inducing signal is additionally recorded on the disk D using the optical head 1. Thus, if the beat-inducing signal recorded on the disk D is reproduced along with the wobbling signal, a beat signal is generated in the push-pull signal (i.e., the tracking control signal) by optical interference between the reproduced beat-inducing signal and the reproduced wobbling signal. The value of the track offset is adjusted for compensation based on the beat signal thus generated in the push-pull signal.

Accordingly, the track offset can be compensated while all the offset factors are taken into consideration.

Moreover, there is no need to perform any sampling operation for tracking-error signal many times and therefore, the time for the compensation is very short.

EXAMPLES

To explain the invention more concretely, some examples performed by the inventor are presented below.

In the following examples, a phase-change type optical disk was used as the optical disk D. However, it is needless to say that any other optical disks (e.g., recordable disks with an organic pigment film and magneto-optical disks) than the phase-change type optical disk may be used for the invention.

Example 1

As the optical disk D, a phase-change type optical disk was used. This disk was formed in the following way.

A polycarbonate glass substrate (diameter: 120 mm, thickness: 0.6 mm, track pitch: 0.74 $\mu$m) was prepared. A $ZnS$—$SiO_2$ interference film (thickness: 170 nm), an AgInSbTe recording film (thickness: 14 nm), and a $ZnS$—$SiO_2$ protection film (thickness: 20 nm) were successively deposited on the substrate. An AlTi reflection film (thickness: 100 nm) was formed on the $ZnS$—$SiO_2$ protection film.

As the recording film, any chalcogenide-system material may be used. For example, any phase-change material belonging to the GeSbTe, InSbTe, InSe, InTe, AsTeGe, $TeO_x$-GeSn, TeSeSn, SbSeBi, BiSeGe, and AgInSbTe-systems may be used. As the reflection film, Al, AlCr, or AgPdCu may be used. As the substrate, acrylic resin or glass may be used, which may be covered with a resin film. The substrate may be disk- or card-shaped.

Wobbled grooves were formed on the disk in such a way that a wobbling signal of 818 kHz was generated if the disk was rotated at a tangential velocity of 3.49 m/s. This is the same as that of the DVD+RW standard. The recording clock was set at 26.16 MHz. The modulation method of the recording signal was the same as that of the DVD+RW standard.

The period of the wobbling grooves (i.e., the wobbling signal) corresponded to 32T, where T was the clock period. Therefore, a signal wish a period of 28T was used as the beat-inducing signal. The signal with the period of 28T was a single-frequency signal comprising a 14T mark and a 14T space. Since the period of the wobbling signal was 32T while that of the beat-inducing signal was 28T, the period of the beat-inducing signal was 0.875 times as much as the period of the wobbling signal. This means that the beat-inducing signal satisfies the above-described condition for generating a desired beat in the push-pull signal.

Thereafter, under the above-described condition, the track offset was compensated using the first determination method shown in FIGS. 13A and 13B. After the compensation was completed, the synchronization at the wobbling signal with the wobbling grooves on the disk was able to be well achieved and at the same time, the BLER of the ADIP signal was limited at approximately 60%. From this fact, it was seen that the method of compensating the track offset according to the invention was actually effective.

The track-offset compensation was carried out at an area or location of the disk D the diameter of which was approximately 40 mm. This compensation operation necessitated a short time of approximately 350 ms. This means that the disk was rotated approximately 10 times through the compensation operation, in other words, the steps A1 to A3 of FIG. 2 were repeated approximately five times.

Moreover, to increase the speed of the track-offset compensation, the inventor tried to conduct a method that several different values of the track offset were recorded on the disk D in advance and then, they were used for reproduction in a lump. Specifically, a track-offset value was set for each sector (length: approximately 2 mm) in a track of the disk and then, the beat-inducing signal was recorded on the same track. Thereafter, the beat-inducing thus recorded in the single track of the disk was reproduced for all the different offset values, thereby finding an optimum track-offset value for compensation. In this case, it took approximately 70 ms (which corresponded to two rotations of the disk D for one recording operation and one reproduction operation) to compensate the track offset at a location of the disk at which the diameter was approximately 40 mm.

The optical disk used in this example included 60000 wobbled portions for the circumference at a diameter of approximately 40 mm. Therefore, to detect the error rate of $10^{-6}$ using the previously-explained prior-art compensation method like the above-described prior-art methods disclosed in the Patent No. 2606509 and the Publication No. 9-7200, the disk needs to be rotated approximately 20 times to sample the reproduced signal at least $10^5$ times. Moreover, since the signal thus obtained through this operation is for only one value of the track offset, the operation needs to be repeated many times in order to optimize the track offset.

Unlike this, in the track-offset compensation method of the example 1 of the invention, the track-offset compensation was completed in such a short time as (1/10) to (1/100) of the required time for the prior-art method of the Japanese Patent No. 2606509 and the Japanese Publication No. 9-7200.

Example 2

The same process steps were carried out to compensate the track offset using the same optical disk as used in the example 1, except than the second determination method of FIGS. 14 and 15 was used instead of the first determination method.

As a result, the output signals (i.e., the filtered beat signal of the push-pull signal) shown in FIGS. 15A and 15B were obtained for the good and no-good beat signals. After the track compensation was completed using these output signals, the synchronization of the wobbling signal with the wobbling grooves was able to be well achieved using the push-pull signal and at the same time, the BLER of the ADIP signal was limited at approximately 60%. From this fact, it was seen that the method of compensating the track offset according to the invention was actually effective.

Furthermore, different track-offset values were set for sectors (length: approximately 2 mm) in one track of the disk at which the diameter was approximately 40 mm. Thereafter, the beat-inducing signal was recorded there and their reproduced to find an optimum offset value or position. In this case, it took approximately 70 ms (which corresponded to two rotations of the disk) to compensate the track offset.

Variations

Needless to say, the present invention is not limited to the above-described embodiment and the examples 1 and 2. Any change or modification may be added to the embodiment within the spirit of the invention. For example, the configuration of the optical disk drive 50 as shown in FIG. 1 may be changed to any one if it provides approximately the same function.

While the preferred forms of the present invention have been described it is to be understood that modifications will be apparent to those skilled in the art without departing from the spirit of the invention. The scope of the present invention, therefore, is to be determined solely by the following claims.

What is claimed is:

1. A method for compensating track offset in an optical disk drive, comprising:
    (a) providing an optical disk with wobbled grooves;
      the wobbled grooves being used for generating a wobbling signal with a wobbling period;
    (b) recording a beat-inducing signal on the disk;
      a period of the beat-inducing signal having a specific relationship with the wobbling period in such a way that a beat signal is induced by the beat-inducing signal and the wobbling signal;
    (c) generating a tracking-error signal using a push-pull method by optically reading the wobbled grooves of the disk and the beat-inducing signal recorded on the disk;
      the tracking-error signal containing a beat signal induced by the beat-inducing signal and the wobbling signal; and
    (d) compensating track offset based on the beat signal contained in the tracking-error signal.

2. The method according to claim 1, wherein the period of the beat-inducing signal is set at a value within a range from 0.85 to 1.25 times as much as the period of the wobbling signal.

3. The method according to claim 1, wherein a level of the beat signal is compared with a first reference level and a second reference level in the step (d) of compensating track offset, where the first reference level is different from the second reference level;

and wherein if the level of the beat signal has a first relationship with the first reference level and a second relationship with the second reference level, the beat signal is determined as good.

4. The method according to claim 1, wherein a dc component of the beat signal is extracted;

and wherein the track-offset value is set in such a way that the dc component of the beat signal is set at a specific level.

5. The method according to claim 4, wherein the specific level is approximately zero.

6. The method according to claim 1, wherein in the step (d) of compensating track offset, whether the beat signal is good or not is judged with respect to a specific value of the track offset;

and wherein if the beat signal is judged as good, the track offset is fixed at the specific value;

and wherein if the beat signal is judged as no-good, the specific value of the track offsets is changed to a different value and then, whether the beat signal is good or not is judged again.

7. A method for compensating track offset in an optical disk drive, comprising:

(a) providing an optical disk with wobbled grooves and a beat-inducing signal;
the wobbled grooves being used for generating a wobbling signal with a wobbling period;
a period of the beat-inducing signal having a specific relationship with the wobbling period in such a way that a beat signal is induced by the beat-inducing signal and the wobbling signal;

(b) generating a tracking-error signal using a push-pull method by optically reading the wobbled grooves and the beat-inducing signal recorded of the disk;
the tracking-error signal containing a beat signal induced by the beat-inducing signal and the wobbling signal; and (c) compensating track offset based on the beat signal contained in the tracking-error signal.

8. The method according to claim 7, wherein the period of the beat-inducing signal is set as a value within a range from 0.85 to 1.25 times as much as the period of the wobbling signal.

9. The method according to claim 7, wherein a level of the beat signal is compared with a first reference level and a second reference level in the step (c) of compensating crack offset, where the first reference level is different from the second reference level;

and wherein if the level of the beat signal has a first relationship with the first reference level and a second relationship with the second reference level, the beat signal is determined as good.

10. The method according to claim 7, wherein a dc component of the beat signal is extracted;

and wherein the track-offset value is set in such a way that the dc component of the beat signal is set at a specific level.

11. The method according to claim 10, wherein the specific level is approximately zero.

12. The method according to claim 7, wherein in the step (c) of compensating track offset, whether the beat signal is good or not is judged with respect to a specific value of the track offset;

and wherein if the beat signal is judged as good, the track offset is fixed at the specific value;

and wherein if the beat signal is judged as no-good, the specific value of the track offset is changed to a different value and then, whether the beat signal is good or not is judged again.

13. A system for compensating track offset in an optical disk drive, comprising:

(a) means for recording a beat-inducing signal on an optical disk with wobbled grooves;
the wobbled grooves being used for generating a wobbling signal with a wobbling period;
a period of the beat-inducing signal having a specific relationship with the wobbling period in such a way that a beat signal is induced by the beat-inducing signal and the wobbling signal;

(b) means for generating a tracking-error signal using a push-pull method by optically reading the wobbled grooves of the disk and the beat-inducing signal recorded on the disk;
the tracking-error signal containing a beat signal induced by the beat-inducing signal and the wobbling signal; and (c) means for compensating track offset based on the beat signal contained in the tracking-error signal.

14. The system according to claim 13, wherein the period of the beat-inducing signal is set at a value within a range from 0.85 to 1.25 times as much as the period of the wobbling signal.

15. The system according to claim 13, wherein a level of the beat signal is compared with a first reference level and a second reference level in the means for compensating track offset, where the first reference level is different from the second reference level;

and wherein if the level of the beat signal has a first relationship with the first reference level and a second relationship with the second reference level, the beat signal is determined as good.

16. The system according to claim 13, further comprising a filter for extracting a do component of the beat signal;

wherein the track offset value is set in such a way that the do component of the beat signal is set at a specific level.

17. The system according to claim 16, wherein the specific level is approximately zero.

18. The system according to claim 13, wherein in the means for compensating track offset, whether the beat signal is good or not is judged with respect to a specific value of the track offset;

and wherein if the beat signal is judged as good, the track offset is fixed at the specific value;

and wherein if the beat signal is judged as no-good, the specific value of the track offset is changed to a different value and then, whether the beat signal is good or not is judged again.

19. An optical disk drive comprising the system according to claim 13.

20. A system for compensating track offset in an optical disk drive, comprising:

(a) means for generating a tracking-error signal using a push-pull method by optically reading wobbled grooves of an optical disk and a beat-inducing signal recorded on the disk;

the wobbled grooves being used for generating a wobbling signal with a wobbling period;

a period of the beat-inducing signal having a specific relationship with the wobbling period in such a way that a beat signal is induced by the beat-inducing signal and the wobbling signal;

the tracking-error signal containing a beat signal induced by the beat-inducing signal and the wobbling signal; and (b) means for compensating track offset based on the beat signal contained in the tracking-error signal.

21. The system according to claim 20, wherein the period of the beat-inducing signal is set at a value within a range from 0.85 to 1.25 times as much as the period of the wobbling signal.

22. The system according to claim 20, wherein a level of the beat signal is compared with a first reference level and a second reference level in the means for compensating track offset, where the first reference level is different from the second reference level;

and wherein if the level of the beat signal has a first relationship with the first reference level and a second relationship with the second reference level, the beat signal is determined as good.

23. The system according to claim 20, further comprising a filter for extracting a dc component of the beat signal;

wherein the track-offset value is set in such a way that the dc component of the beat signal is set at a specific level.

24. The system according to claim 23, wherein the specific level is approximately zero.

25. An optical disk drive comprising the system according to claim 20.

* * * * *

UNITED STATES PATENT AND TRADEMARK OFFICE
CERTIFICATE OF CORRECTION

PATENT NO. : 6,885,622 B2
DATED : April 26, 2005
INVENTOR(S) : Ogawa

It is certified that error appears in the above-identified patent and that said Letters Patent is hereby corrected as shown below:

Column 17,
Line 60, "crack" should be -- track --.

Signed and Sealed this

Nineteenth Day of July, 2005

JON W. DUDAS
*Director of the United States Patent and Trademark Office*